United States Patent [19]

Carter et al.

[11] Patent Number: 4,831,831

[45] Date of Patent: May 23, 1989

[54] THERMAL STORAGE UNIT WITH COIL EXTENSION DURING MELT

[75] Inventors: Thomas P. Carter, Laurel; Lindsay L. Haman, Columbia; Robert P. Miller, Riva; Edward N. Schinner, Highland, all of Md.

[73] Assignee: Baltimore Aircoil Company, Inc., Jessup, Md.

[21] Appl. No.: 155,869

[22] Filed: Feb. 16, 1988

[51] Int. Cl.4 .............................................. F25D 3/00
[52] U.S. Cl. .......................................... 62/59; 62/434
[58] Field of Search ................................. 62/59, 434

[56] References Cited

U.S. PATENT DOCUMENTS

| 3,271,968 | 9/1966 | Karnath | 62/59 |
| 3,672,183 | 6/1972 | Bernstein | 62/59 |
| 4,294,083 | 10/1981 | King | 62/434 |

Primary Examiner—Ronald C. Capossela
Attorney, Agent, or Firm—Charles E. Bouton; Edward J. Brosius

[57] ABSTRACT

Method and apparatus for thermal storage improved to deliver cold liquid refrigerant during a supply cycle by freezing storage liquid envelopes only on tubes defining refrigerant flow paths during an ice production and storage cycle and extending the effective flow paths during the supply cycle through supplementary conduits immersed in free storage liquid which is chilled by the exterior of the frozen envelopes.

23 Claims, 4 Drawing Sheets

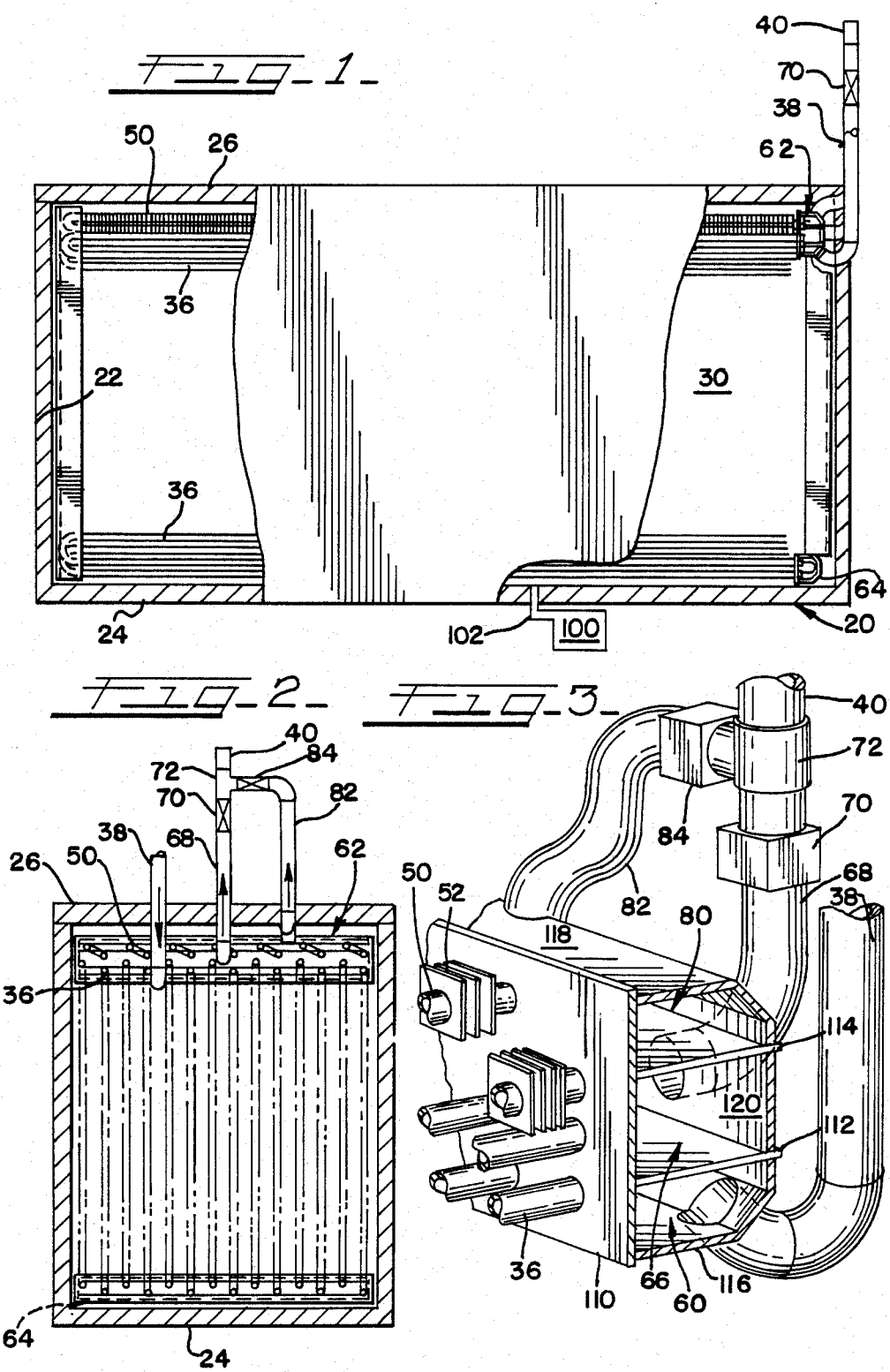

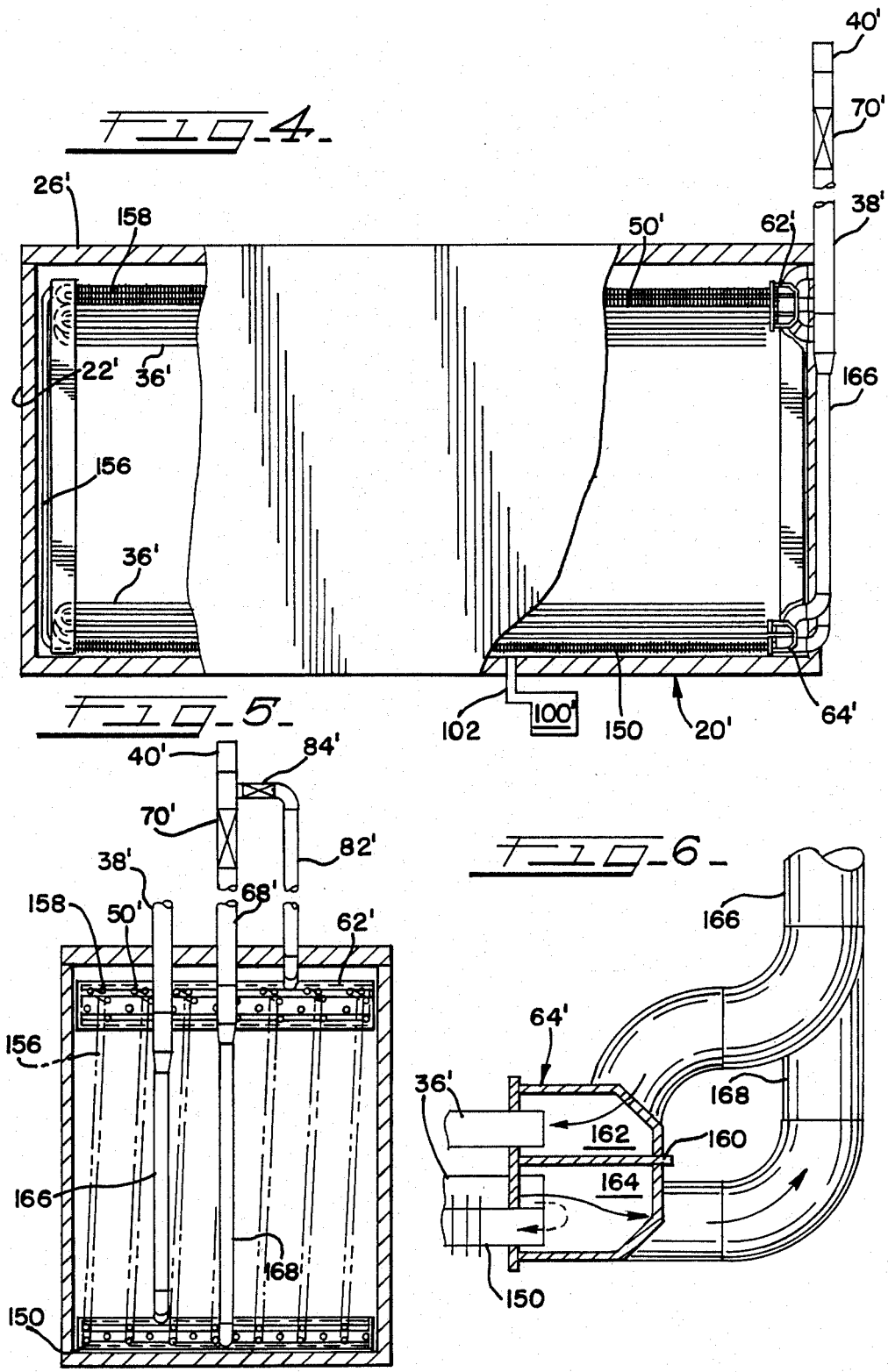

THERMAL STORAGE UNIT WITH COIL EXTENSION DURING MELT

BACKGROUND OF THE INVENTION

This invention relates to thermal storage and more particularly is an improved method and apparatus for utilizing ice which is formed and stored in a vessel.

Thermal storage equipment of the type which forms ice during off peak energy periods and then makes the ice available as a supply of cold for space conditioning, and the like, is known. In one form of such thermal storage equipment a refrigerant liquid, such as brine or an ethylene glycol solution, is flowed through a channel which is immersed in a pool of freezeable storage liquid, such as water. The pool of water, or the like, is confined within a vessel and the refrigerant channel usually is a form of tubing bent into a serpentine with plural tube runs immersed in the pool. Plural refrigerant channels are usually packed in parallel within the pool and connected between inlet and outlet headers which receive and discharge the refrigerant liquid from, and to, one or more heat exchangers in which the refrigerant liquid is cooled during the ice production cycle, and warmed during the cold supply cycle. The storage liquid is usually agitated during at least certain periods of operation to lessen temperature stratification.

During the ice production cycle cold refrigerant liquid, at a temperature below the solidification point of the storage liquid within the pool, is continuously produced by mechanical refrigeration, or the like, in one heat exchanger (usually referred to as a "chiller") and flowed to the inlet header through the channels and out of the outlet header and returned to the chiller. The storage liquid will freeze on the channels in the form of surrounding envelopes and gradually develop a substantial thickness of frozen liquid (usually ice). At a point just before the envelopes on parallel adjacent channels contact one another the optimum effective storage capacity will be reached. However, a quantity of unfrozen storage liquid will normally remain free along the walls of the vessel and between adjacent frozen envelopes, and such free liquid will equilibrate at a temperature close to the freezing point.

During the supply cycle the refrigerant liquid is circulated to a heat exchanger (such as a component of a space air conditioning system), where the refrigerant is warmed, and returned to the channels within the thermal storage unit where it is cooled by the frozen envelopes. However, as each envelope melts internally to form a liquid sleeve around the refrigerant channel, the liquid sleeve will increase in temperature above the storage liquid freezing point and to an extent will partially insulate the channel surface from the remaining frozen envelope. This results in a temporary increase in the temperature of the refrigerant liquid exiting from the outlet header (above the storage liquid freezing point) thereby lowering the design parameter of the thermal storage unit due to its inability to continuously deliver refrigerant liquid close to the freezing temperature of the storage liquid. The latter condition, although temporary, will continue until the frozen envelope is opened by heat convection of the liquid sleeve whereupon the agitated free liquid, exterior of the envelope, also becomes available to chill the tube surface. The condition may also be partially relieved at such time that the buoyant effect of the free liquid in the vessel lifts the frozen envelope sufficiently to urge the ice against the lower portions of tube surface.

Thus it would be highly advantageous to overcome the effect of the liquid sleeve that forms between tube and frozen envelope during an early part of the supply cycle.

SUMMARY OF THE INVENTION

Accordingly, it is a primary object of the present invention to provide an improved method and apparatus for continuously obtaining refrigerant liquid from thermal storage equipment at a more uniform temperature just above the freezing temperature of the storage liquid.

It is another object of the present invention to provide an improved method and apparatus for evening the temperature at which liquid refrigerant exits a thermal storage unit throughout a cold supply cycle.

It is a further object of the present invention to provide an improved method and apparatus for supplying a substantially constant temperature flow of cold liquid refrigerant from an ice storage unit.

It is a still further object of the present invention to provide an ice thermal storage apparatus having supplemental conduits immersible in free storage liquid and connected to add to the flow path of liquid refrigerant that also is passed through ice enveloped channels.

It is yet another object of the present invention to provide a method for selectively adding to the flow paths of liquid refrigerant through an ice storage unit within conduits chilled with free storage liquid.

It is still another object of the present invention to provide an ice thermal storage apparatus having supplemental conduits immersible in free storage liquid and connected to receive partly chilled liquid refrigerant from ice enveloped tubes.

Briefly stated the present invention provides for supplementing the cooling of refrigerant liquid with free storage liquid by providing a flow path addition for refrigerant liquid exposed to free storage liquid during the supply cycle, when the refrigerant liquid is passed through a primary flow path surrounded by a frozen envelope previously formed during a storage cycle. The cumulative effect of refrigerant liquid transiting a flow path addition immersed in free liquid and the primary flow path surrounded by a frozen envelope being functionally sufficient to reduce the refrigerant liquid temperature to about the temperature of the free liquid; and during the storage cycle a frozen envelope is formed by chilled refrigerant only on the primary flow path through a channel constantly immersed in the storage liquid. Preferably such supplementing of the cooling is accomplished by subsequently passing the refrigerant liquid serially through a conduit immersed in free storage liquid that is chilled by the frozen envelope so as to bring the refrigerant liquid to close to the free storage liquid temperature.

An apparatus to perform the method comprises a supplemental conduit in addition to a refrigerant channel that is immersed in a storage liquid pool confined within a vessel, and means to cause the supplemental conduit to be functionally inoperative and incapable of envelope formation during the period when a frozen envelope is being formed on the refrigerant channel.

In preferred embodiments of the invention the flow path addition for refrigerant liquid is through an area of the liquid pool within the thermal storage vessel which area is kept free of a frozen envelope; that is each flow path addition may be within the vessel and spaced from an envelope or from a frozen envelope formation zone. However, it is also possible to locate each flow path addition either within or outside of the thermal storage vessel but remote from the normal storage liquid pool geometry and to move free liquid into contact with the flow path addition only during the supply cycle when refrigerant liquid is chilled by frozen storage liquid in the vessel.

BRIEF DESCRIPTION OF THE DRAWINGS

Further objects and advantages of the invention will become apparent from the following detailed description taken in conjunction with the drawings wherein:

FIG. 1 is a side elevation of a thermal storage apparatus with parts removed to show details of a preferred embodiment of the present invention;

FIG. 2 is an end view of the apparatus of FIG. 1;

FIG. 3 is a detailed perspective view in partial section of a portion of the apparatus of FIG. 1;

FIG. 4 is a side elevation of a thermal storage apparatus with parts removed to show details of a modified embodiment of the invention;

FIG. 5 is an end view of the apparatus of FIG. 4;

FIG. 6 is a detailed view of a portion of the apparatus shown in FIG. 4;

DETAILED DESCRIPTION OF THE INVENTION

Figure 7:
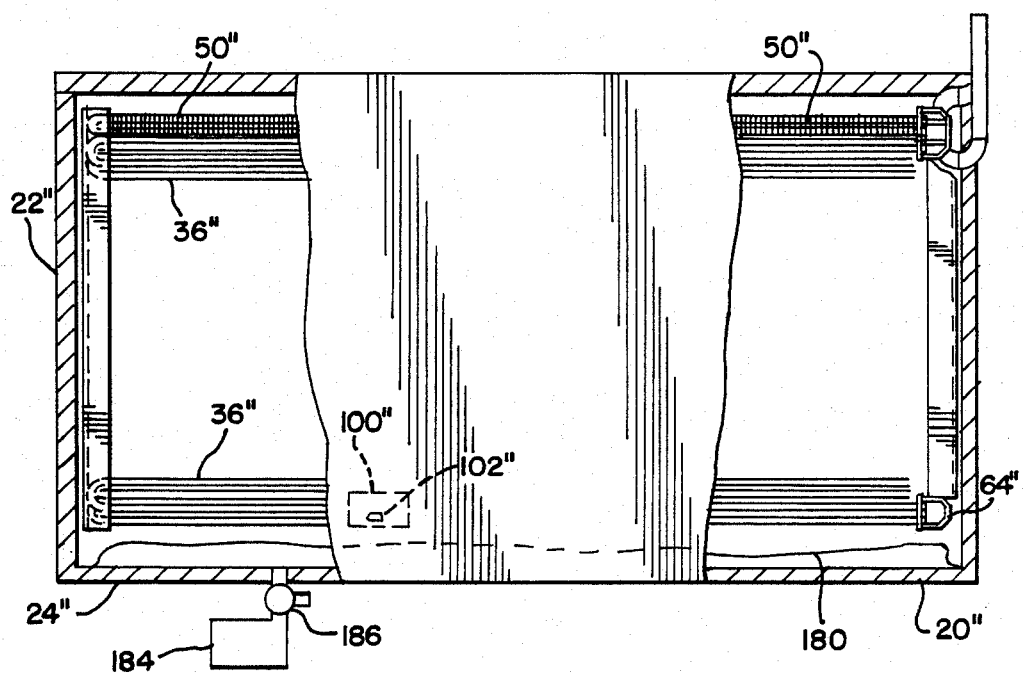
FIG. 7 is a side elevation view of another embodiment of the present invention.

It has been observed that during a cold supply cycle the liquid refrigerant exiting a thermal storage unit, of the type which freezes storage liquid on the surface of refrigerant circulation channels during a storage cycle, will initially approach the freezing temperature at the beginning of the supply cycle and then increase as a sleeve or annulus of melted storage liquid forms between each channel and the frozen envelope. According to this invention, it has been found that this undesirable temperature increase may be lessened and usually eliminated by maintaining a quantity of unfrozen storage liquid, herein referred to as free storage liquid, in contact with the frozen liquid, herein referred to as ice, within a thermal storage unit and during only the supply cycle providing flow path additions for the liquid refrigerant (preferably after it passes through primary flow paths comprising enveloped channels), through a supplemental zone immersed in free storage liquid.

By thus providing flow path additions the liquid refrigerant is further cooled by the free storage liquid that is, in turn, chilled by the ice present in the storage unit; and each flow path addition is suitably adjusted by length, or by other modification of the surface for heat transfer between the liquid refrigerant and the storage liquid, to lower the liquid refrigerant temperature to just above the temperature of the free liquid and the ice.

The supplemental zone excludes the channels on which ice is frozen and is not subject to the formation of ice therein. It may be within or directly adjoin and receive a flow of liquid from the pool of storage liquid wherein the channels for freezing are located, but the supplemental zone will not contain channels functioning to form ice. It is also possible to separate the supplemental zone from the pool by flowing free storage liquid to the supplemental zone during only the cold supply cycle.

Preferably the liquid refrigerant flow path additions are series extensions of primary flow paths and may be provided in a number of ways, such as by periodically diverting the liquid refrigerant from a channel outlet and through supplementary conduit which is continuously immersed in the storage liquid and/or by continuously flowing the liquid refrigerant through supplementary conduit that is immersed in free storage liquid only during the supply cycle.

For convenience of expression the terms "tube" (tubes and tubing) and "ice" are used herein to refer to a physical channel for the primary flow path for liquid refrigerant, and to a frozen form or state of the storage liquid, respectively. However, it will be understood that the flow path channel may be selected from several known structures in addition to tubes, such as spaced plates, pressed and welded plates etc., and the storage liquid may be water or other known freezable liquids and liquid solutions which has a heat of fusion when undergoing phase change between solid and liquid.

A preferred embodiment of apparatus for carrying out the foregoing method is illustrated in FIGS. 1-3. Similar to prior forms of thermal storage units, the present apparatus includes a vessel generally 20 insulated walls 22, bottom 24 and top cover 26. The cover 26 may be removable to access the interior of the vessel 20.

A pool of storage liquid 30 is maintained within the vessel; and a plurality of freezing tubes 36 are arrayed, usually in serpentine configuration, within the vessel and immersed in the pool 30. The tubes 36 communicate with an inlet pipe 38 and an outlet pipe 40 which in turn are connectable to a refrigerant system, including heat exchangers such as a chiller, and a space air conditioner, neither shown.

The foregoing apparatus elements do not constitute the present invention, per se. In normal operation the foregoing apparatus elements are operated during an ice production/storage cycle in a manner to receive cold liquid refrigerant from a chiller (not shown) through pipe 38 and to pass it through the tubes 36 to the outlet pipe 40 whence is is returned to the chiller. During this cycle the cold refrigerant causes the storage liquid in pool 30 to freeze about the tubes 36 and gradually build up an encircling ice envelope surrounding each tube. Normally, if the storage liquid is agitated, it is inefficient to continue to build ice beyond the point just before there is contact between the ice envelopes on adjacent tubes 36 on parallel vertical serpentine circuits and the storage cycle is completed upon reaching that condition which may leave a quantity of free, unfrozen storage liquid at the top and bottom of the vessel and between ice envelopes.

Thereafter a cold supply cycle may be undertaken by circulating the liquid refrigerant from outlet pipe 40 to an air conditioner (not shown) where it is warmed (absorbs heat) and returning it through inlet pipe 38 to the tubes 36 where the liquid refrigerant is chilled by means of the ice envelopes about the tubes. It will be understood that the aforementioned chiller, thermal storage unit and air conditioner may be interconnected in a manner that allows for intermittent and alternate cycling and also for overlapped operation. In the latter case both the chiller and thermal storage unit function to concurrently and serially (or in parallel) chill the liquid refrigerant so as to handle the heat load of an air conditioner during peak demand.

According to the present invention the thermal storage unit is improved by adding supplementary conduits 50 to functionally extend the path of the liquid refrigerant for chilling within the thermal storage unit by contact with free storage liquid during only the cold supply cycle. That is it is essential that the supplementary conduits 50 are not functionally operable to form ice envelopes as that condition would defeat the ability to overcome the aforementioned deficiency of the prior apparatus.

In the embodiment of FIG. 1-3 the supplementary conduits 50 are arrayed in two horizontal runs above the bank of serpentine tubes 36 and the storage liquid pool 30 is maintained to a level above the conduits 50. The conduits 50 are preferably provided with fins 52, best seen in FIG. 3, to maximize heat transfer surface area; however it is within the ambit of the invention to utilize smooth wall conduits and corrugated and fluted conduits, and the like.

It may be best seen in FIG. 3 that at an upper end of the vessel 20 the tubes 36 are connected to the inlet pipe 38 by means of an inlet header 60 which forms a lower compartment of a tri-part manifold generally 62. In the apparatus illustrated plural tubes 36 run in serpentine courses downwardly, within the vessel 20 to a lower manifold 64; and alternate serpentine courses of the tubes 36 extend upwardly from the manifold 64 to a first outlet header 66 which is a central compartment of the tri-part manifold 62. Alternate courses of tubes 36 provide counter-directional liquid flow in adjacent courses of tubes. This arrangement compensates for variation in ice thickness in that the rate of ice build up tends to decline along the flow length of a tube serpentine. At least one elbow pipe 68 extends from the first outlet header 66 through a first control valve 70 to a "T" union 72 joined to outlet pipe 40. When the first control valve 70 is open, liquid refrigerant introduced through inlet pipe 38 and header 60 may flow through the downward and upward courses of tubes 36 and exit directly from the first outlet header 66 through elbow 68 and valve 70 to the outlet pipe 40.

The supplementary conduits 50 are also connected to the first outlet header 66 in close proximity to the ends of tubes 36. It will be understood that the conduits 50 are spaced above the tubes 36 a distance of at least approximately one-half the vertical distance between horizontal tube runs so as to be above the ice envelope on the uppermost runs of tubes 36. Conduits 50 extend through the upper level of the storage liquid pool 30, above the tubes 36, and are connected to a second outlet header 80 which, in the illustrated embodiment, is in the form of an uppermost compartment of the tri-part manifold 62. A second elbow pipe 82 and second control valve 84 are connected between the second outlet header and the "T" union 72 and hence to outlet pipe 40. It may be followed in FIGS. 2 and 3 that when valve 84 is open liquid refrigerant may flow through the conduits 50 and exit to the outlet pipe 40.

The apparatus embodiment of FIGS. 1-3 is operated to close the second valve 84 and open the first valve 70 during a storage cycle which causes cold liquid refrigerant supplied through inlet pipe 38 (from a chiller unit not shown) to exit through the first outlet header 66 and elbow pipe 68 to the outlet pipe 40 and not flow through the supplementary conduits 50. Thus ice will be formed in the pool 30 only on the tubes 36 and not on conduits 50 nor in the zone of pool 30 through which the conduits 50 extend.

During a supply cycle the first control valve 70 is closed and the second valve 84 opened. This condition prevents liquid refrigerant from exiting the first outlet manifold 66 through elbow 68 and forces the refrigerant flow to extend through conduits 50 to the second outlet header 80 and thence through elbow pipe 82 to the outlet pipe 40. Since ice is not formed around the conduits 50 during a storage cycle they remain immersed in free storage liquid that is chilled by the ice on the tubes 36 therebelow.

It is to be further noted that provision is made to agitate the storage liquid pool during at least portions of the cycles so as to minimize temperature stratification and promote uniform ice buildup and ice melt. This is shown in FIG. 1 in the form of an air supply, such as pump 100 and connector hose 102, at the vessel bottom 24.

Furthermore it is to be noted that while the aforementioned headers 60, 66 and 80 could be physically separated channels, the combined structure illustrated in FIG. 3 is highly advantageous from the standpoints of compactness and economy. The tri-part manifold 62 may be of symmetrical construction of corrosion resistant metal, or the like, comprising a single face plate 110 having openings to which all tubes and conduits are connected at one side with two perpendicular divider walls 112, 114 extending from the other side, and having outer angled walls 116, 118 defining the inlet header 60 and second outlet header 80, respectively, and box plate 120 which defines the first outlet header 66.

A modified embodiment of the invention is shown in FIGS. 4-6 wherein parts similar to those illustrated in FIGS. 1-3 are designated with the same reference characters bearing prime notations. In this embodiment additional supplementary conduits 150 are ranged across the bottom of the vessel 20' beneath the lowermost runs of tubes 36'. Additionally the alternating courses of tubes 36' are independently connected to the inlet pipe 38' so as to provide counter-directional liquid refrigerant flow in adjacent courses of tubes 36'.

In the embodiment of FIGS. 4-6 the lower manifold 64' is divided horizontally by a wall 160 into an upper entry chamber 162 and a lower outlet chamber 164. The ends of alternate course of tubes 36' are connected, respectively, to chambers 162 and 164. A first extension pipe 166 is connected between the entry chamber 162 and the inlet pipe 38'. A second extension pipe 168 is connected between the outlet chamber 164 and the elbow pipe 68' extending from the first outlet header 66'. Those courses of tubes 36' that are connected to the inlet chamber 162 extend, in serpentine form, upwardly and are connected to the first outlet header 66'. The alternate courses of tube 36' connected to the outlet chamber 164 similarly extend downwardly from the inlet header 60'. Finally the additional supplementary conduits 150 extend from the outlet chamber 164 beneath tubes 36' horizontally across the bottom of the storage liquid pool 30 and are connected by vertical risers 156 to single upper conduit runs 158, which are spaced between conduits 50', extending into the second outlet header 80'. When control valves 70', 84', which may be solenoid actuated, are operated the flow will be similar to that described for the first described embodiment.

That is during a storage cycle valve 70' is open and valve 84' is closed to deliver cold liquid refrigerant to both the inlet header 60' and the entry chamber 162. The refrigerant will flow in opposite directions through alternate courses of tubes 36' to the respective outlet chamber 164 and first outlet header 66' and thence directly through pipes 168 and 68' to the outlet pipe 40' (as closed valve 84' will block any flow through the conduits 50' and 150). Similarly during a supply cycle, with valve 70' closed and valve 84' open, the liquid refrigerant cannot exit from either outlet chamber 164 through pipe 168 or the first outlet header 66' through pipe 68' and is thus forced to flow therefrom through extended paths provided by the conduits 150 (and 158) and 50' respectively to exit through the second outlet header 80' and pipe 82' to the outlet pipe 40'. Thus configuration is believed to be slightly more efficient in that it utilizes free liquid at the bottom of pool 30' which may not convect upwardly through the ice field on tubes 36'; and also allows for a greater length of supplemental conduit.

It is also possible to further modify the apparatus of FIGS. 4-6, particularly where smooth non-finned conduits are employed, to train one or more conduit runs between the alternate courses of serpentine tubes 36 in the longitudinal spaces that remain unfrozen between adjacent ice envelopes.

FIG. 7 illustrates a modification of the embodiment of FIGS. 1-3. In this apparatus the bank of tubes 36'' is spaced from the bottom 24'' of the vessel 20'' so as to leave a body of free unfrozen storage liquid beneath the tubes during the ice storage cycle. It is intended that the upper level of the pool 30'' would cover the upper runs of tubes 36'' but would not reach the supplementary conduits 50'. A flexible and inflatable bladder 180 is secured to the vessel bottom wall 24'' and a source of pressurized gas 184, such as air or carbon dioxide (usually an air pump), is connected through a three way valve 186 to the space between bottom wall 24'' and bladder 180. The valve 186 also has an exhaust port to permit release of gas from the bladder 180. In operation the bladder 180 is inflated during the supply cycle whereby it will expand against the lower ice envelopes and lift the free storage liquid to a higher level in vessel 20'' so as to immerse the supplementary conduits 50. During the storage cycle the three way valve is actuated to exhaust the bladder 180 which will collapse under the weight of the storage liquid and thereby lower the pool 30'' below the conduits 50'. Otherwise operation is similar to the embodiment of FIGS. 1-3; however since the conduits 50'' will not be immersed in storage liquid during the storage cycle, and therefore be incapable of ice formation, it is also possible to provide direct connections between tubes 36'' and conduits 50'' allowing liquid refrigerant to flow through both during the storage cycle as well as during the supply cycle.

Figure 8:
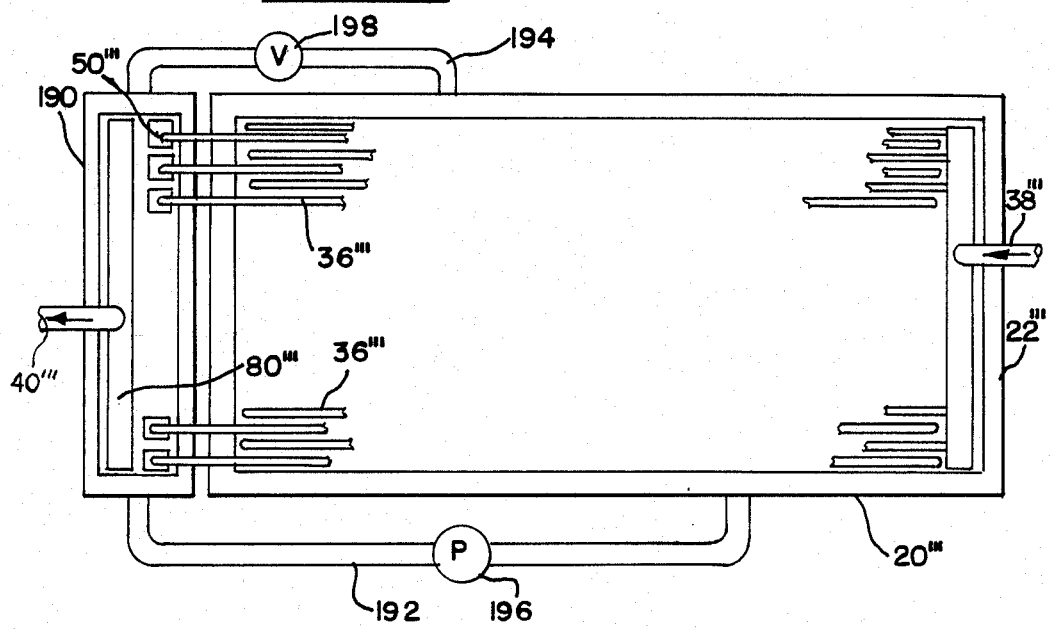
FIG. 8 is a plan view of a further embodiment of the present invention.

A further embodiment illustrated in FIG. 8 provide for direct extension of tubes 36'''' into respective supplementary conduits 50'''' which are located in a tank 190 physically separated from the vessel 20''''. The conduits 50'''' may comprise one or more rows which end at a discharge header 80'''' to which an outlet pipe 40'''' is attached. The lower levels of vessel 20'''' and tank 190 are interconnected by pipes 192, 194 which permit storage liquid to be circulated therebetween. A pump 196 in pipe 192 is operable to withdraw liquid from the tank 190; and a two way shut off valve 198 in pipe 194 is operable to block flow of storage liquid from the vessel 20''''. Thus in operation during a storage cycle when cold liquid refrigerant flows through tubes 34'''' and conduits 50'''' the valve 198 is closed and pump 196 operated to empty the tank 190 (whereby ice cannot be formed on the conduits 50''''); and during a supply cycle the valve 198 is opened and pump 196 operated continuously to circulate free storage liquid from vessel 20'''' through tank 190 and across the conduits 50'''' which will thereby become immersed in the free storage liquid.

The tank 190 of the embodiment shown in FIG. 8 may be geometrically relocated with respect to the vessel 20''''. For instance it may be located to either side or to either end of the vessel 20''''. Also tank 190 may be conveniently located above the vessel 20'''' in which case the pump 196 would be reversed to move liquid from vessel 20'''' to tank 190 during only the supply cycle and valve 198 could be eliminated and the tank 190 will drain by gravity to be empty of storage liquid during the storage cycle.

Figure 9:
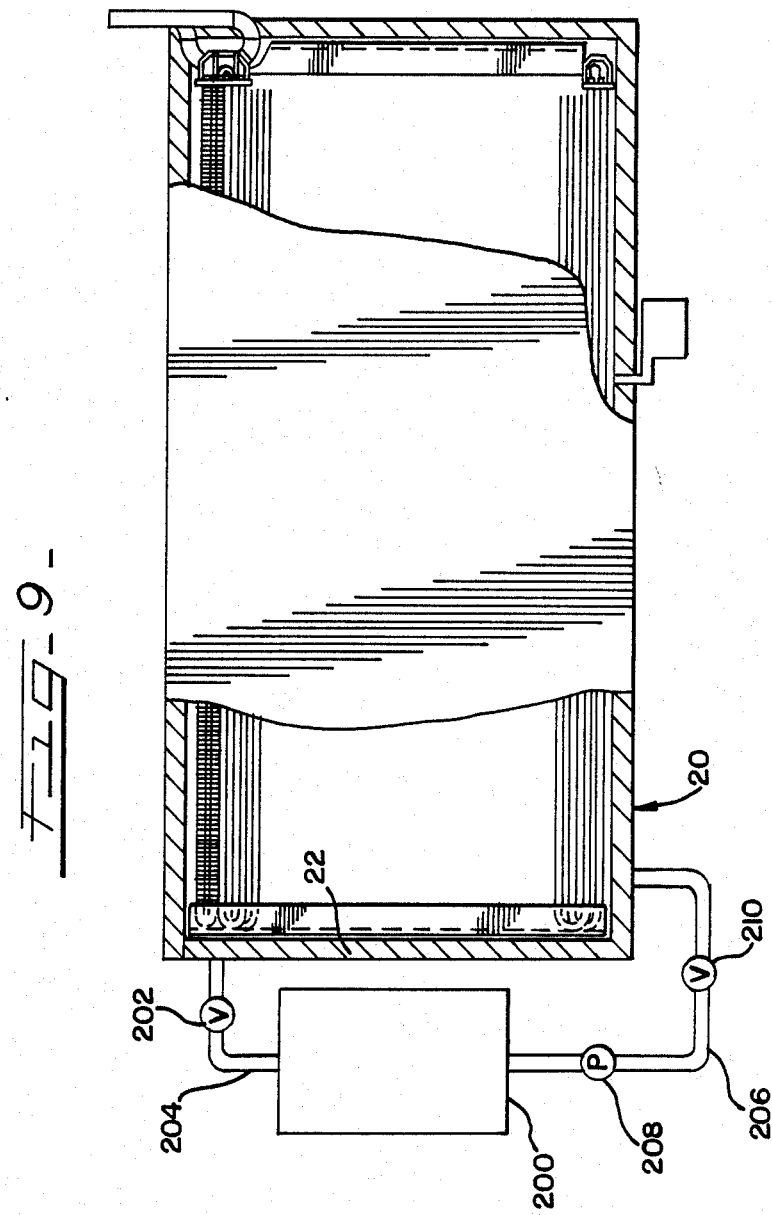
FIG. 9 is a side elevation of still another embodiment of the present invention.

Still another apparatus embodiment is illustrated in FIG. 9. This embodiment is similar to the embodiments of FIGS. 1 and 7 except that the freezing tubes 36 are directly connected to the supplementary conduits 50, which continuously discharge through outlet header 80, and a separate reservoir 200 is connected by a valve 202 and drain pipe 204 to a point in the pool of storage liquid at vessel wall 22 between the uppermost row of tubes 36 and the lowermost row of conduits 50. The reservoir is also connected by a resupply pipe 206, pump 208 and valve 210 to the vessel 20, preferably through the bottom 24. During the storage cycle some of the storage liquid is drained through open valve 202 into the reservoir 200 where it is retained by closing the valve 210. Thus the upper level of the storage liquid pool 30 will be maintained below the conduits 50 and no ice will be formed thereon. During the supply cycle the valve 202 is closed and valve 210 is opened for a period to operate pump 208 to transfer liquid from the reservoir 200 back into the vessel 20 so as to raise the level of the free storage liquid to a point above the uppermost conduit 50. This plan may be further modified by changing the elevation of reservoir 200 with respect to the vessel 20 and rearranging the valves and pump so as to provide for extracting storage liquid by pumping and returning same to vessel 20 by gravity flow.

Further variations and modifications may be made without departing from the spirit and scope of the invention which is defined in the following claims.

What is claimed is:

1. An improved method for thermal storage and recovery wherein frozen liquid is formed and stored during a storage cycle by passing cold refrigerant liquid through one or more primary flow paths confined within a storage zone of storage liquid thereby creating envelopes of frozen liquid around the primary flow paths, said improvement comprising:

flowing relatively warmer refrigerant liquid through said primary flow paths within said envelopes during a supply cycle and additionally flowing refrigerant liquid through additions to said flow paths said additions being immersed in storage liquid that is cooled by said envelopes.

2. The method of claim 1 wherein said additions to said primary flow paths are in a supplementary zone and storage liquid is introduced into said zone at least during said supply cycle.

3. The method of claim 1 including the step of removing said additions from immersion in storage liquid during said storage cycle.

4. The method of claim 1 including the step of diverting said refrigerant liquid from said additions to said flow paths during said storage cycle.

5. The method of claim 1 wherein flowing said refrigerant liquid through additions follows the flowing of said refrigerant liquid through primary flow paths within said envelopes.

6. An improved method for thermal storage and recovery wherein frozen liquid is formed and stored during a storage cycle by passing cold refrigerant liquid through one or more primary flow paths through channels confined within a storage zone of storage liquid thereby creating an envelope of frozen liquid around the channels, said improvement comprising:
maintaining a quantity of unfrozen free storage liquid within said storage zone during said storage cycle;
extending said primary flow paths through conduits located in a supplemental zone;
and flowing at least one of said refrigerant liquid through the conduits, and said free storage liquid from said storage zone into said supplemental zone during only a supply cycle when said frozen liquid is employed to cool said refrigerant liquid.

7. The method of claim 6 including the steps of positioning said conduits within said free storage liquid in said storage zone and diverting said refrigerant liquid to said conduits during said supply cycle.

8. The method of claim 6 including the steps of positioning said conduits in a supplementary zone and introducing said free storage liquid to said supplementary zone only during said supply cycle.

9. The method of claim 8 wherein said supplementary zone is above said storage zone and said free storage liquid is lifted to said supplementary zone.

10. An improved thermal storage apparatus wherein a liquid refrigerant is flowed through a channel immersed in a pool of freezeable storage liquid contained within a vessel for the purpose of forming frozen storage liquid along said channel during a storage cycle and for melting the frozen storage liquid during a cold supply cycle, said improvement comprising;
a supplemental conduit immersible in free unfrozen storage liquid and said supplemental conduit being connectable to said channel during said cold supply cycle;
and means to cause said supplemental conduit to be functionally inoperative during said storage cycle.

11. The apparatus of claim 10 wherein said supplemental conduit is constantly immersed in said pool within said vessel and said means functions to divert flow of liquid refrigerant form said supplemental conduit during said storage cycle.

12. The apparatus of claim 11 wherein said means includes a system of valves.

13. The apparatus of claim 11 wherein said channel and one end of said supplementary conduit are interconnected to a first outlet header and another end of said supplementary conduit is connected to a second outlet header.

14. The apparatus of claim 13 wherein first and second valves are connected respectively to said first and said second outlet headers so as to limit discharge from one of said headers.

15. The apparatus of claim 10 wherein said supplementary conduit is positioned so as to be outside of said pool of freezeable storage liquid during said storage cycle, and said means move free storage liquid into contact with said conduit only during said supply cycle.

16. The apparatus of claim 15 wherein said supplementary conduit is positioned above said channel and said means lifts free storage liquid to immerse said conduit.

17. The apparatus of claim 16 wherein said means includes a pump connected to a separate tank containing said conduit.

18. The apparatus of claim 16 wherein said means includes an inflatable bladder within said vessel whereby to raise the level of said pool to immerse said conduit.

19. The apparatus of claim 16 wherein said means includes a reservoir and a pump connected to said vessel so as to transfer free liquid between said vessel and said reservoir whereby to raise and lower the level of said pool with respect to said conduit.

20. The apparatus of claim 15 including a separate tank with said conduit therein and said means includes a pipe connecting said vessel and said tank and a pump to circulate free storage liquid therebetween.

21. An improved thermal storage apparatus wherein frozen liquid is formed and stored during a storage cycle by passing cold refrigerant liquid through one or more channels immersed in a pool of storage liquid confined within a vessel thereby creating an envelope of frozen storage liquid around the channels and leaving a quantity of free storage liquid within said vessel, said improvement comprising:
a supplemental conduit serially connected to said channels to receive refrigerant liquid therefrom, said supplemental conduit being located in a zone in communication with said pool of storage liquid;
and means to flow at least one of said refrigerant liquid and said free storage liquid in said zone during only a cold supply cycle when said frozen liquid is employed to cool said refrigerant liquid.

22. An improved thermal storage apparatus wherein a liquid refrigerant is flowed through plural tubes trained in runs immersed in a pool of freezeable storage liquid contained within a vessel for the purpose of forming frozen storage liquid along said tube runs during a storage cycle and for melting the frozen storage liquid during a cold supply cycle, said improvement comprising:
supplemental conduits immersed in said pool of liquid;
valve means operable to connect said supplemental conduit in series to said tube runs to receive refrigerant flow during said cold supply cycle and to disconnect said supplemental conduits from said tube runs during said storage cycle, whereby frozen liquid is formed only on said tube runs and during the cold supply cycle said free storage liquid in said vessel, which is cooled by the frozen storage liquid about said tubes, serves to chill said refrigerant flowing through said supplemental conduit from said tube runs during said cold supply cycle.

23. The apparatus of claim 22 wherein said valve means includes a multi-part manifold divided into at least a first outlet header and a second outlet header, said tubes being connected to said first outlet header and said supplemental conduits connected between said first outlet header and said second outlet header, a first valve connected between said first outlet header and an outlet pipe and a second valve connected between said second outlet header and said outlet pipe.

* * * * *